(12) United States Patent
Vogan et al.

(10) Patent No.: US 8,438,455 B2
(45) Date of Patent: May 7, 2013

(54) ERROR CORRECTION IN A SOLID STATE DISK

(75) Inventors: Andrew Wayne Vogan, Aloha, OR (US); Richard Coulson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 878 days.

(21) Appl. No.: 12/319,208

(22) Filed: Dec. 31, 2008

(65) Prior Publication Data
US 2010/0169743 A1 Jul. 1, 2010

(51) Int. Cl.
G06F 11/00 (2006.01)

(52) U.S. Cl.
USPC .......................................... 714/764; 714/773

(58) Field of Classification Search .................. 714/763, 714/764, 773, 800, 803
See application file for complete search history.

(56) References Cited

U.S. PATENT DOCUMENTS

| | | | | |
|---|---|---|---|---|
| 5,623,506 A * | 4/1997 | Dell et al. | | 714/766 |
| 6,223,301 B1 | 4/2001 | Santeler et al. | | |
| 6,917,547 B2 | 7/2005 | Kanamori et al. | | |
| 7,380,179 B2 * | 5/2008 | Gower et al. | | 714/53 |
| 7,536,625 B2 * | 5/2009 | Seng et al. | | 714/755 |
| 7,543,218 B2 | 6/2009 | Chung | | |
| 7,904,790 B2 * | 3/2011 | Lee et al. | | 714/763 |
| 8,276,028 B2 * | 9/2012 | Man et al. | | 714/721 |
| 2003/0023924 A1 * | 1/2003 | Davis et al. | | 714/763 |
| 2004/0163028 A1 | 8/2004 | Olarig | | |
| 2004/0168101 A1 | 8/2004 | Kubo | | |
| 2006/0026489 A1 | 2/2006 | Noda et al. | | |
| 2007/0233937 A1 | 10/2007 | Coulson | | |
| 2007/0277060 A1 | 11/2007 | Cornwell et al. | | |
| 2008/0028133 A1 | 1/2008 | Kwon | | |
| 2008/0034269 A1 | 2/2008 | Hwang et al. | | |
| 2008/0155379 A1 * | 6/2008 | Katoh et al. | | 714/764 |
| 2008/0250270 A1 * | 10/2008 | Bennett | | 714/6 |
| 2008/0288814 A1 | 11/2008 | Kitahara | | |
| 2009/0013240 A1 * | 1/2009 | Argon et al. | | 714/803 |
| 2009/0158126 A1 * | 6/2009 | Perlmutter et al. | | 714/773 |
| 2009/0164836 A1 * | 6/2009 | Carmichael | | 714/6 |

(Continued)

FOREIGN PATENT DOCUMENTS

| | | |
|---|---|---|
| WO | 2010/078167 A2 | 7/2010 |
| WO | 2010/078167 A3 | 9/2010 |

OTHER PUBLICATIONS

International Search Report and Written Opinion received for PCT Patent Application No. PCT/US2009/069286, mailed on Aug. 5, 2010, 9 pages.

(Continued)

*Primary Examiner* — Marc Duncan
(74) *Attorney, Agent, or Firm* — Ryder, Lu, Mazzeo and Konieczny, LLC; Douglas J. Ryder

(57) ABSTRACT

In some embodiments, a solid state disk includes a non-volatile memory and a controller. The controller performs ECC on data stored on the non-volatile memory, and performs a parity operation on the data if the ECC cannot correct the data. Other embodiments are described and claimed.

21 Claims, 2 Drawing Sheets

U.S. PATENT DOCUMENTS

| | | | | |
|---|---|---|---|---|
| 2009/0287956 A1* | 11/2009 | Flynn et al. | | 714/6 |
| 2010/0115377 A1* | 5/2010 | Kim et al. | | 714/763 |
| 2010/0122148 A1* | 5/2010 | Flynn et al. | | 714/773 |
| 2011/0239088 A1* | 9/2011 | Post | | 714/763 |
| 2011/0296277 A1* | 12/2011 | Flynn et al. | | 714/773 |
| 2011/0320915 A1* | 12/2011 | Khan | | 714/773 |
| 2012/0011416 A1* | 1/2012 | Hong et al. | | 714/773 |

OTHER PUBLICATIONS

Office Action received for European Patent Application No. 09837021.6, mailed on Sep. 8, 2011, 2 pages.

International Preliminary report on Patentability received for PCT Patent Application No. PCT/US2009/069286, mailed on Jul. 14, 2011, 7 pages.

European Search Report received for European Patent Application No. 09837021.6, mailed on Jul. 25, 2012, 3 pages.

Office Action received for European Patent Application No. 09837021.6, mailed on Aug. 6, 2012, 6 pages.

Office Action received for Korean Patent Application No. 2011-7015123, mailed on Aug. 31, 2012, 3 pages of English Translation only.

* cited by examiner

ERROR CORRECTION IN A SOLID STATE DISK

TECHNICAL FIELD

The inventions generally relate to improved reliability in a solid state mass storage product.

BACKGROUND

A solid state disk (SSD) is a high performance storage device that contains no moving parts. SSDs are much faster than typical hard disk drives with conventional rotating magnetic media, and typically include a controller to manage data storage. The controller manages operations of the SSD, including data storage and access as well as communication between the SSD and a host device. The controller also performs Error Correction Code (ECC) to assure integrity of the data written on the SSD. ECC identifies and corrects errors in data communicated between the SSD and the host device. However, some failure mechanisms of the storage media exceed the correction capabilities of the ECC engine resulting in unrecoverable data or data loss. For example, a catastrophic die failure.

U.S. patent application Ser. No. 11/396,262 filed on Mar. 31, 2006 and entitled "Improving Reliability of Write Operations to a Non-Volatile Memory" addresses program failure by keeping a copy of all the data written to an erase block until the last program operation succeeds. This patent application addresses program failure issues rather than ECC failure issues or die failure issues. Therefore, a need has arisen to address ECC failures and/or die failures.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Figure 1:
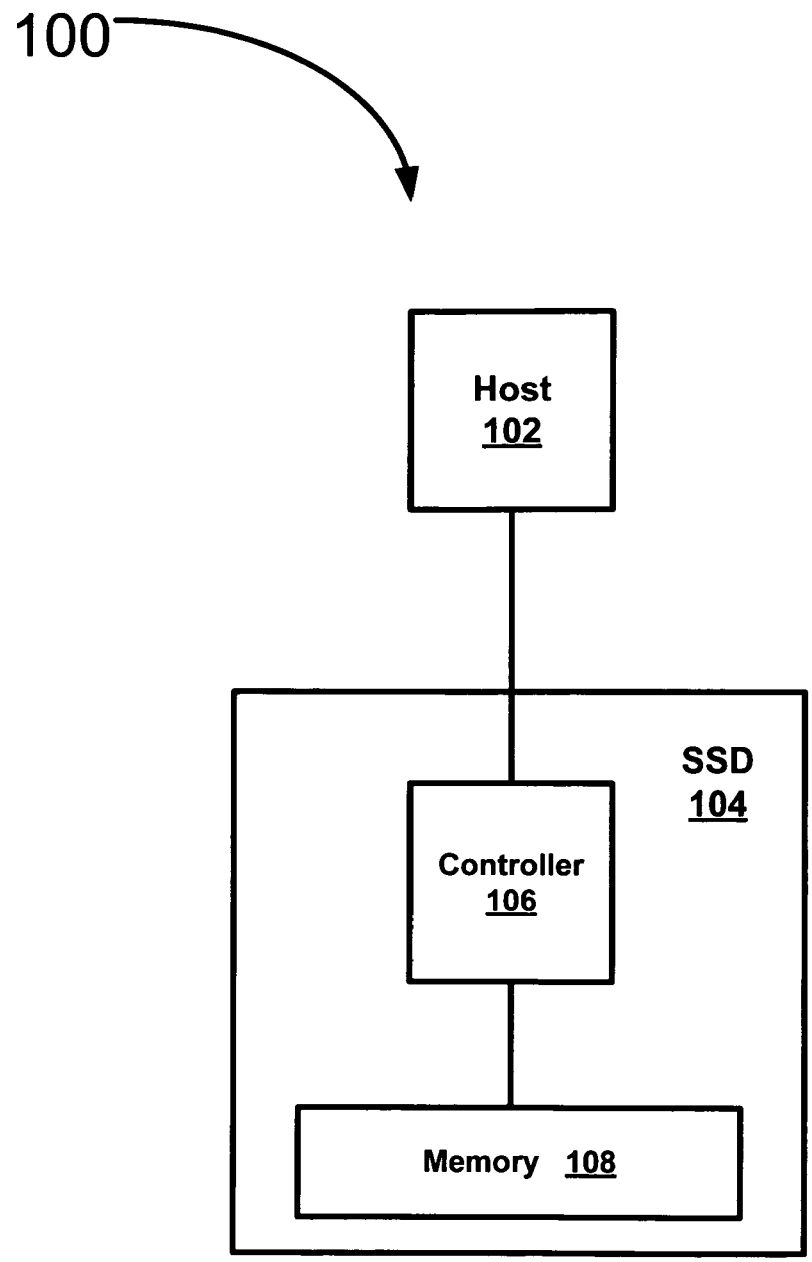
FIG. 1 illustrates a system according to some embodiments of the inventions.

Some embodiments of the inventions relate to improved error correction in a solid state disk.

In some embodiments, a solid state disk (SSD) includes a non-volatile memory and a controller. The controller performs ECC (Error Correcting Code) on data stored on the non-volatile memory, and performs a parity operation on the data if the ECC cannot correct the data.

In some embodiments, a system includes a host and a solid state disk. The solid state disk includes a non-volatile memory and a controller. The controller performs ECC on host data stored on the non-volatile memory, and performs a parity operation on the data if the ECC cannot correct the data.

In some embodiments, ECC is performed on data stored on a non-volatile memory of a solid state disk. A parity operation is performed on the data if the ECC cannot correct the data.

In some embodiments exclusive OR (XOR) error correction code (ECC) techniques are used to protect a solid state disk (SSD) from component level failure, programming failures (for example, NAND programming failures), and/or uncorrectable errors from the primary ECC system. For example, in some embodiments, parity techniques (for example, Redundant Arrays of Independent Disks or RAID implementations) that are similar to those used in mass storage environments may be implemented in the non-volatile memory environment of an SSD. In some embodiments, write data from the host flows through an XOR parity generator, and the host data plus the parity is written to the non-volatile memory. In the event that the primary ECC engine of the SSD cannot correct a host sector, or in the event that a die (for example, a NAND die) has failed, a second level of error correction in implemented according to some embodiments in order to obtain the correct data.

In some embodiments, parity and host data, excluding the uncorrectable sectors, are read from the media and the missing data is recovered using an XOR operation. In a case of a program failure such as a NAND program failure where data previously written to an erase block has been corrupted when a program failure occurs on a subsequent write/program within the same erase block, each of the previously written but currently corrupted pages in the erase block are recovered one at a time using an XOR operation. The same type of XOR operation may be used in the case of a primary ECC failure or a program failure.

Since a single SSD may contain around 80 NAND die, the mean time to failure (MTTF) of an SSD product may be increased according to some embodiments by approximately six times longer due to the ability to tolerate a NAND die failure and continue operation without data loss. This MTTF improvement is very significant. Further, according to some embodiments, data reliability relative to implementations using primary ECC is increased by several orders of magnitude. This is because when reading, if the ECC correction fails due to more error bits than the ECC can correct, redundant XOR data may be used to reconstruct the original data. Similarly, when writing, if a program failure occurs that corrupts other data on the same erase block, the reconstruction of corrupted data may be performed according to some embodiments. These are critical improvements in for SSDs and for NAND memory, particularly as NAND memory becomes based on finer lithography.

FIG. 1 illustrates a system 100 according to some embodiments. In some embodiments system 100 includes a host 102 and an SSD 104. In some embodiments, SSD 104 is not limited to being referred to as SSD, and can include any type of non-volatile memory. SSD 104 includes a controller 106 and memory 108. In some embodiments memory 108 is non-volatile memory such as NAND memory. In some embodiments, controller 106 includes an ECC engine (not illustrated in FIG. 1) to perform ECC to assure integrity of the data written on the memory 108 of the SSD 104. The ECC identifies and corrects errors in data communicated between the SSD 104 and the host 102. However, sometimes the ECC engine in controller 106 is not able to correct a host sector of data, and a die failure (for example, in a NAND die included in the memory 108 of the SSD 104) may cause data integrity problems. Therefore, in some embodiments, controller 106 further includes an XOR parity generator, for example, to perform XOR techniques in the event that the primary ECC engine cannot correct a host sector, or in the event that a die in memory 108 has failed, for example.

Figure 2:
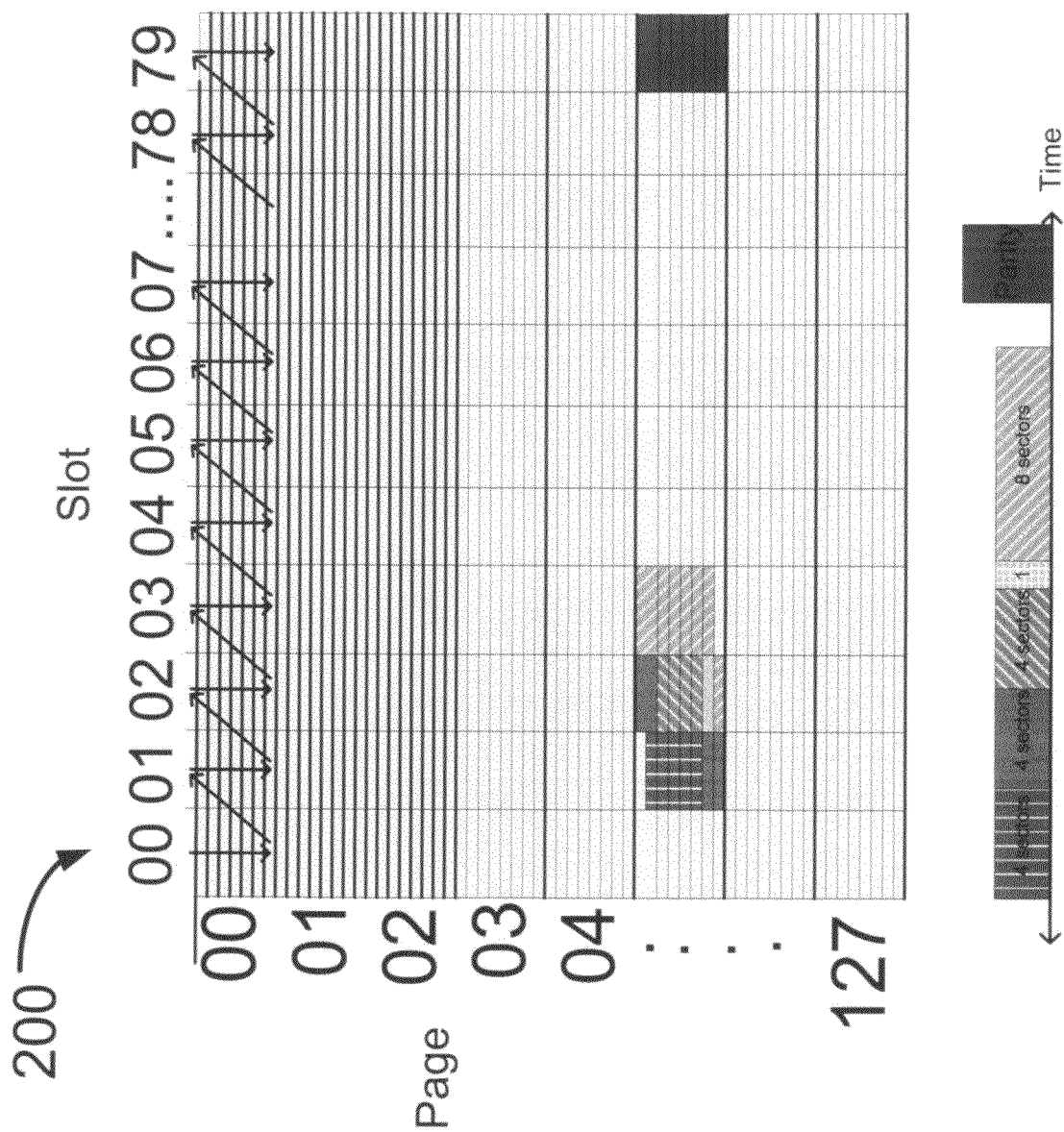
FIG. 2 illustrates a flow according to some embodiments of the inventions.

FIG. 2 illustrates a graphical representation 200 of a non-volatile memory according to some embodiments. Graphical representation 200 includes pages 00 through 127 on the vertical axis and slots 00 to 79 on the horizontal axis. Each page in FIG. 2 includes an exemplary eight sectors. The slots graphically illustrate, for example, in some embodiments, 80 memory dies on an SSD, and/or are an abstraction of a memory channel and/or a chip enable. In some embodiments, the slots 00 through 79 each represent an engine capable of concurrent work with the other slots.

As illustrated in FIG. 2, content from the host is written to the memory (for example, a NAND memory) in chronological order. Content fills an eight sector page at page 00 and slot 00, and then the next content is written at the next slot 01 of the page 00, and so on, as shown by the arrows throughout page 00 at the top of graph 200. XOR parity is generated on the fly as host content is received. When the host content has filled all slots for a page except for the last slot (that is, has filled slots 00 through 78, for example) a parity page is inserted into the flow at slot 79, for example, and occupies that last slot for that page. That is sector 0 of the parity page written to slot 79 in this example is the XOR of all sector 0 content of slots 00 through 78 for that page, and similarly sector 1 of the parity page written to slot 79 is the XOR of all sector 1 content of slots 00 through 78 for that page, and so on. In some embodiments, the parity sectors are the XOR of the host content and the metadata, but not the ECC field. In this manner, each sector of the parity page contains an ECC specific to its content.

FIG. 2 shows an example of content and parity being written to a portion of a page. Four sectors are written to sectors two through five of slot 01, then four sectors are written to sectors six and seven of slot 01, and sectors one and two of slot 02. Then four sectors are written to sectors three through six of slot 02, and one sector is written to sector seven of slot 02. Then eight sectors are written to sector eight of slot 02, and sectors one through seven of slot 03. Eight parity sectors are calculated on a sector by sector basis using XOR, for example, and are then written into the eight sectors of slot 79 as the parity data.

In embodiments with one parity slot 79 as described above, in the event of an uncorrectable error in any sector of any page of slots 00 through 78, the SSD can read that sector number from all of the pages except for the one in error, and XOR the content of those sectors along with the corresponding parity sector in slot 79 in order to recover the missing content. In some embodiments, ECC such as Bose-Chaudhuri-Hocquengen (BCH) correction occurs on each sector, including the parity, and an uncorrectable state is used to trigger the second level of ECC recovery by XORing the content.

In the embodiments discussed above with one parity slot 79, a single parity page per array of slots 00 through 78 will protect from hard errors and catastrophic die failure. In embodiments, in which protection against component failure that takes out more than one slot other implementations are available according to some embodiments. For example, in order to protect against component failure that would take out two slots, two parity pages may be inserted per slot array (for example, at slots 39 and 79). The parity at slot 39 may be used to cover slots 00 to 38, and the parity at slot 79 may be used to cover slots 40 to 78 in some embodiments. The slot array may be adjusted accordingly so that a package failure would take out one slot from the parity stripe of slots 00 to 39 and a second slot from the parity stripe of slots 40 through 79. For example, if package 5 is mapped with two CE into slots 5 and 45, then the described parity stripes would protect from component failure at a capacity cost of 2.5%. The capacity cost may be cut in half if die failures (and not package failures) are to be protected.

While XOR has been used previously in multiple mass storage device environments, according to some embodiments a technique is available to protect content from catastrophic component failure in the context of a single storage device (for example, an SSD). In an SSD environment, where indirection allows all writes essentially to be sequential, there is no penalty associated with random write operations. In addition, problems that are particular to SSDs such as NAND programming failures resulting in a loss of previously written data may be solved according to some embodiments. In some embodiments, program failures are addressed in a low cost manner, and additionally addresses die failures and ECC failures.

Although some embodiments have been described herein as being implemented in a particular manner, according to some embodiments these particular implementations may not be required. For example, although FIG. 1 illustrates and describes one controller to perform ECC and XOR operations, it is noted that separate controllers (and/or dedicated controllers) may be used according to some embodiments.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A solid state disk comprising:
   non-volatile memory made up of a plurality of memory die, wherein each memory die includes a plurality of sectors, and wherein a plurality of pages are formed from a subset of the plurality of sectors for each of the plurality of memory die; and
   a controller to
   write data to the non-volatile memory, wherein the data is written to a page in chronological order through the plurality of memory die and sector by sector to the memory die;
   generate error correction code (ECC) on the data written to the non-volatile memory;
   perform a parity operation on the data contained in corresponding sectors of the plurality of memory die; and
   write the parity data to at least one of the plurality of memory die in a corresponding sector.

2. The solid state disk of claim 1, wherein the controller is further to generate replacement data from parity data for data that contains errors and cannot be corrected using the ECC.

3. The solid state disk of claim 1, wherein the controller performs the parity operation as an XOR operation.

4. The solid state disk of claim 1, wherein the plurality of memory die are capable of concurrent work.

5. The solid state disk of claim 1, wherein one or more of the plurality of memory die are reserved for parity information.

6. The solid state disk of claim 1, wherein the non-volatile memory is made up of a plurality of NAND die.

7. The solid state disk of claim 1, wherein one or more of the plurality of memory die are NAND die.

8. A system comprising:
   a host; and
   a solid state disk including:
      non-volatile memory made up of a plurality of memory die, wherein each memory die includes a plurality of sectors, and wherein a plurality of pages are formed from a subset of the plurality of sectors for each of the plurality of memory die; and
      a controller to
         write data to the non-volatile memory, wherein the data is written to a page in chronological order through the plurality of memory die and sector by sector to the memory die,
         generate error correction code (ECC) on the data written to the non-volatile memory,
         perform a parity operation on the data contained in corresponding sectors of the plurality of memory die; and
         write the parity data to at least one of the plurality of memory die in a corresponding sector.

9. The system of claim 8, wherein the controller is further to generate replacement data from parity data for data that contains errors and cannot be corrected using the ECC.

10. The system of claim 8, wherein the controller performs the parity operation as an XOR operation.

11. The system of claim 8, wherein the plurality of memory die are capable of being written to concurrently.

12. The system of claim 8, wherein one or more of the plurality of memory die are reserved for parity information.

13. The system of claim 8, wherein the non-volatile memory is made up of a plurality of NAND die.

14. The system of claim 8, wherein one or more of the plurality of memory die are NAND die.

15. A method comprising:
   writing data to a non-volatile memory, wherein the non-volatile memory includes a plurality of memory die, wherein each memory die includes a plurality of sectors, wherein a plurality of pages are formed from a subset of the plurality of sectors for each of the plurality of memory die, and wherein the data is written to a page in chronological order through the plurality of memory die and sector by sector to the memory die;
   generating error correction code (ECC) on the data written to the non-volatile memory;
   performing a parity operation on the data contained in corresponding sectors of the plurality of memory die; and
   writing the parity data to at least one of the plurality of memory die in a corresponding sector.

16. The method of claim 15, further comprising generating replacement data from parity data for data that contains errors and cannot be corrected using the ECC.

17. The method of claim 15, wherein the performing a parity operation including performing an XOR operation on the data in corresponding sectors.

18. The method of claim 15, wherein the plurality of memory die are capable of being written to concurrently.

19. The method of claim 15, wherein one or more of the plurality of memory die are reserved for parity information.

20. The method of claim 15, wherein the non-volatile memory includes a plurality of NAND die.

21. The method of claim 15, wherein one or more of the plurality of memory die are NAND die.

* * * * *